United States Patent
Guiragossian

[19]

[11] Patent Number: 6,110,261
[45] Date of Patent: Aug. 29, 2000

[54] CHAMBER WITH DRIER

[75] Inventor: Nicolas Guiragossian, Merignac, France

[73] Assignee: Sextant Avionique, Velizy Villacoublay, France

[21] Appl. No.: 09/309,790

[22] Filed: May 12, 1999

[30] Foreign Application Priority Data

May 15, 1998 [FR] France ................... 98 06198

[51] Int. Cl.[7] ........................... B01D 53/04; B01D 53/26
[52] U.S. Cl. ...................... 96/117; 96/117.5; 96/147; 96/152
[58] Field of Search ............... 96/108, 117, 117.5, 96/143, 144, 147, 148, 152

[56] References Cited

U.S. PATENT DOCUMENTS

| | | | |
|---|---|---|---|
| 2,596,979 | 5/1952 | Case ................................. | 96/144 |
| 2,790,512 | 4/1957 | Dow ................................. | 96/152 X |
| 3,142,830 | 7/1964 | Patrick et al. ................. | 96/117.5 |
| 3,236,028 | 2/1966 | Rutan ............................... | 96/144 X |
| 3,271,089 | 9/1966 | Krellen ............................ | 96/148 X |
| 3,306,011 | 2/1967 | Dvorkin .......................... | 96/117.5 |
| 3,352,091 | 11/1967 | Dvorkin .......................... | 96/117.5 |
| 3,705,480 | 12/1972 | Wireman ......................... | 96/117.5 |
| 4,946,485 | 8/1990 | Larsson .......................... | 96/152 |
| 5,110,330 | 5/1992 | Loughran ....................... | 96/117.5 |
| 5,230,719 | 7/1993 | Berner et al. .................. | 55/208 |
| 5,286,282 | 2/1994 | Goodell et al. ................ | 96/144 X |
| 5,425,924 | 6/1995 | Finley ............................. | 96/152 |
| 5,851,269 | 12/1998 | Strope ............................ | 96/144 |

FOREIGN PATENT DOCUMENTS

| | | | |
|---|---|---|---|
| 0 365 066 A1 | 4/1990 | European Pat. Off. . | |
| 61-178018A | 8/1986 | Japan ............................. | 96/152 |
| 3-258322A | 11/1991 | Japan ............................. | 96/108 |
| 4-114714A | 4/1992 | Japan ............................. | 96/143 |
| 4-281132A | 10/1992 | Japan ............................. | 96/143 |
| 4-281133A | 10/1992 | Japan ............................. | 96/143 |
| 4-283332A | 10/1992 | Japan ............................. | 96/143 |
| 5-068844A | 3/1993 | Japan ............................. | 96/108 |
| 6-047240 | 2/1994 | Japan ............................. | 96/143 |
| 6-047241 | 2/1994 | Japan ............................. | 96/143 |
| WO 93/05867 | 4/1993 | WIPO . | |
| WO95/03015 | 2/1995 | WIPO . | |

*Primary Examiner*—Robert H. Spitzer
*Attorney, Agent, or Firm*—Oblon, Spivak, McClelland, Maier & Neustadt, P.C.

[57] ABSTRACT

A chamber with drier comprises a clean chamber communicating with the outside environment through an orifice equipped with a detachable antechamber filled with desiccant granulates. The chamber comprises, between the orifice of the clean chamber and the detachable antechamber filled with desiccant granulates, a valve that is closed at rest and opened by the positioning, on the orifice of the clean chamber, of the antechamber filled with desiccant granulates and the antechamber filled with desiccant granulates contains a baffle that prevents the air from following a direct route and forces it to encounter the majority of the desiccant granulates. Advantageously, the baffle is convergent and there electronic monitoring of the moisture saturation of the desiccant granulates. Furthermore, there may be a single-effect back flow valve bypassing the baffle for a fast decompression of the clean chamber.

9 Claims, 2 Drawing Sheets

CHAMBER WITH DRIER

BACKGROUND OF THE INVENTION

1. Field of the Invention

The present invention relates to the dehumidification of a chamber communicating with an variable-pressure outside environment in order to keep it below a certain dew point threshold to prevent the appearance of crystals or condensation under normal conditions of use. It is indeed important in certain chambers communicating with variable-pressure outside environments, especially chambers enclosing optical projection systems, to prevent the appearance of crystals or condensation vapor that might disturb the propagation of light rays.

2. Description of the Prior Art

To do so, there are known ways of mounting a drier on the orifice through which a chamber communicates with the outside environment. This drier consists of an antechamber open on to the outside environment and filled with desiccant granulates. Thus, the air that the chamber takes from the outer environment as a result of pressure variations gets dried before it reaches the interior of this chamber.

In practice, various drawbacks are encountered. These drawbacks include especially the fact that the drier must be mounted first of all on the orifice of the to chamber and replaced from time to time in order to regenerate its granulates and the fact that, on these occasions, the chamber is in direct communication through its aperture with the outside environment. This makes it necessary each time to vent the chamber by rinsing it out with a dry gas.

It furthermore proves to be the case that the desiccant granulates are poorly utilized when they are simply heaped into an antechamber placed before the aperture of a dryer chamber, for the circulation of air follows preferred paths leading to an inhomogeneous saturation in moisture of the granulates. This makes it necessary to regenerate the granulates well before they are all saturated with moisture.

The present invention is aimed at overcoming the above-mentioned drawbacks in order to obtain a chamber with drier that is easy to maintain and subject to few constraints.

SUMMARY OF THE INVENTION

An object of the invention is a chamber with drier comprising a clean chamber communicating with the outside environment by an orifice equipped with a detachable antechamber filled with desiccant granulates. This chamber with drier is characterized in that, between the orifice of the clean chamber and the detachable antechamber filled with desiccant granulates, it has a valve that is closed at rest and opened by the positioning, on the orifice of the clean chamber, of the antechamber filled with desiccant granulates and in that the antechamber filled with desiccant granulates contains a baffle that prevents the air from following a direct route and forcing it to encounter the majority of the desiccant granulates.

Advantageously, the antechamber filled with desiccant granulates comprises filters at both ends of its baffle, these filters holding the desiccant granulates in the baffle and preventing the spread of dust coming from the erosion of the granulates.

Advantageously, at the end of its baffle pointed towards the orifice that makes it communicate with the clean chamber, the antechamber filled with desiccant granulates comprises a single-action valve with intake into the chamber opening in the compression phase of the internal volume of the clean chamber and a single-action valve with back-flow out of the chamber opening in the decompression phase of the internal volume of the clean chamber and placing the chamber directly in communication with the outside environment by means of a vent positioned in parallel on the baffle.

Advantageously, the baffle of the antechamber filled with desiccant granulates is convergent with a cross-section that narrows down towards the orifice of the chamber.

Advantageously, the antechamber filled with desiccant granulates contains a convergent baffle and a single-action valve with back flow out of the chamber opening in the decompression phase of the internal volume of the clean chamber and placing the chamber directly in communication with the outside environment by means of a vent in parallel on the baffle.

Advantageously, the antechamber filled with desiccant granulates is provided with means to monitor the moisture saturation of the desiccant granulates.

Advantageously, the antechamber filled with desiccant granulates is provided with visual means to monitor the moisture saturation of the desiccant granulates, consisting of a window providing a view of the desiccant granulates placed at the end of the baffle turned towards the orifice of the chamber.

Advantageously, the antechamber filled with desiccant granulates is provided with electronic means to monitor the moisture saturation of the desiccant granulates with two measurement electrodes coming into contact with the desiccant granulates placed at the end of the baffle pointed towards the orifice of the chamber.

BRIEF DESCRIPTION OF THE DRAWINGS

Other features and characteristics of the invention shall appear from the following description of an embodiment given by way of an example. This description shall be given with reference to the appended drawing, wherein.

MORE DETAILED DESCRIPTION

Figure 1:
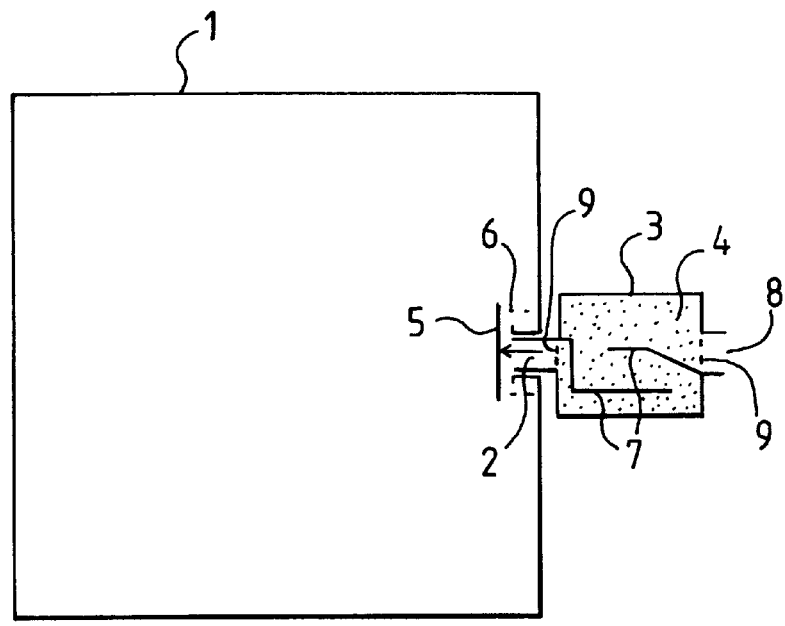
FIG. 1 provides a diagrammatic sectional view of a chamber with drier according to the invention, FIG. 2 provides a sectional view of a convergent baffle filled with desiccant granulates, used to channel the air introduced into the chamber.

FIG. 1 shows a clean chamber 1 communicating with the outside environment through an orifice 2 in order to prevent a pressure differential, between its internal volume and the outside environment, that could make it implode or explode. This clean chamber 1 is liable to exchange a flow of air with the outside environment under the effects of the pressure variations of this outside environment. To prevent this exchange of air flow from leading to a contamination of the internal volume of the clean chamber by moist air that could lower the dew point threshold beyond at which water vapor starts getting condensed and to prevent disturbances such as crystals or condensation in the path of an optical beam travelling through the internal volume of the clean chamber 1, it is necessary to dehumidify the incoming air flow. This is obtained in a known way by making this air flow go through an antechamber 3 in which it is brought into contact with desiccant granulates 4 such as granulates known under the brand name Silicagel which turns from light blue to pale pink when it gets charged with moisture.

The desiccant granulates 4 filling the antechamber 3 of the drier must be regenerated when they are saturated with moisture in order to restore their moisture absorption capacity. This necessitates a periodic dismantling of the antechamber 3. To protect the internal volume of the clean chamber 1 from the possibility of contamination by moist air during the dismantling of the chamber 3 of the drier, the orifice 2 of the clean chamber 1 is fitted with a valve 5 that is closed at rest and opened by the coupling of the antechamber 3 to the orifice 2. The antechamber 3 is for example fitted out with a nozzle having the internal dimensions of the orifice 2 whose nose will push the valve back into the open position when it is drawn back to the closed position by a spring 6.

At its apertures 8 which open on to the outside environment and at the hole 2 of the clean chamber 1, the antechamber 3 is provided with filters 9 whose role is to keep the desiccant granulates 4 within itself and also to stop the dust due to the erosion of the desiccant granulates.

The antechamber 3, which contains the desiccant granulates 4, has its internal volume arranged by a partition 7 and a baffle that leads from an aperture 8 on the outside environment to the orifice 2 of the clean chamber 1. This baffle has the value of extending the path of the air within the antechamber 3 in order to make it encounter a maximum of desiccant granulates. Without this baffle, the air would follow preferred paths, leading to a fast saturation in moisture of the desiccant granulates on these paths and an almost zero saturation in moisture of the desiccant granulates outside these paths, making it necessary to regenerate the drier well before all its granulates have been saturated with moisture.

Figure 2:
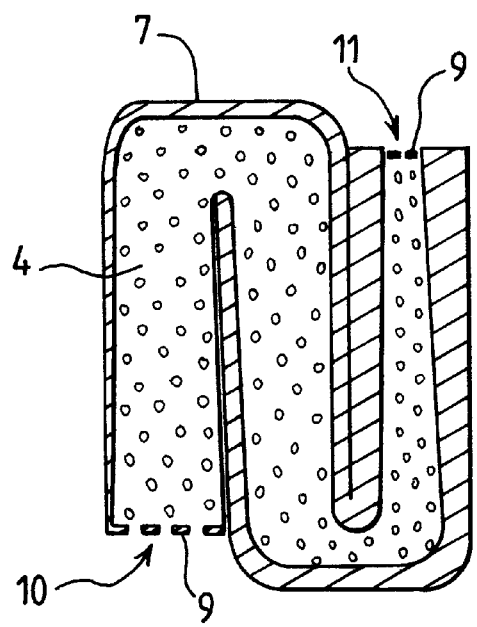

FIG. 2 shows a sectional view of a preferred shape of a baffle. This shape is convergent. Its cross-section goes on decreasing from a wide mouth 10 on the outside environment up to a narrow outlet 11 on the orifice 2 of the chamber 1. In subsonic mode, which is always the case in practice, the speed of flow of a fluid accelerates along a convergently shaped channel. Thus, the speed of the recompression air towards the internal volume of the clean chamber 1 increases along the baffle. This is beneficial because the capacity of the desiccant granulates to trap water molecules increases with the speed of the air that brushes against them.

Figure 3:
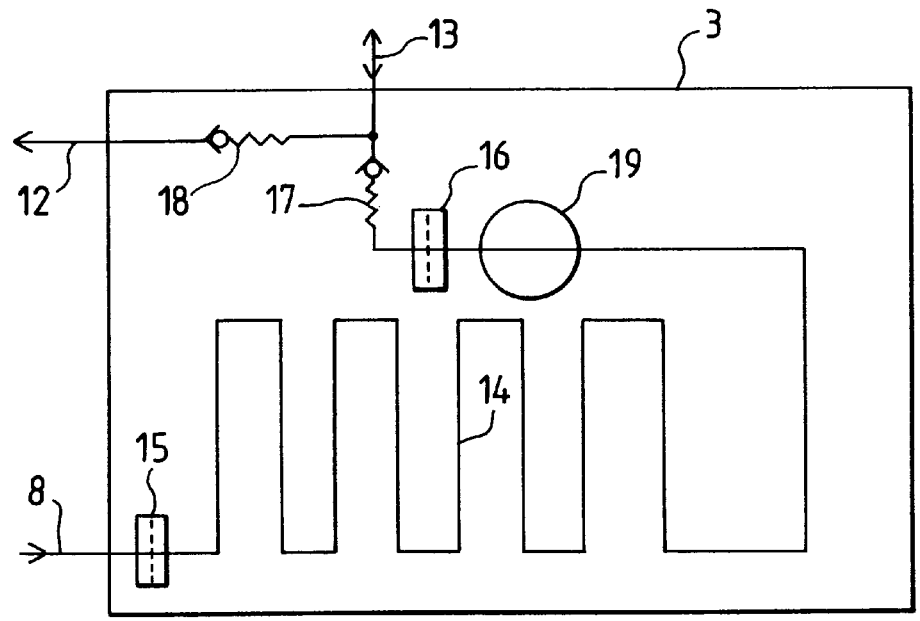
FIGS. 3 and 4 are diagrammatic views of different variants of an antechamber that is attached to the orifice that makes the internal volume of a chamber with drier according to the invention communicate with the outside environment, this antechamber being used as a receptacle for desiccant granulates and being provided with means to monitor the state of saturation of the desiccant granulates and means to monitor the flow of air through the hole.
Figure 4:
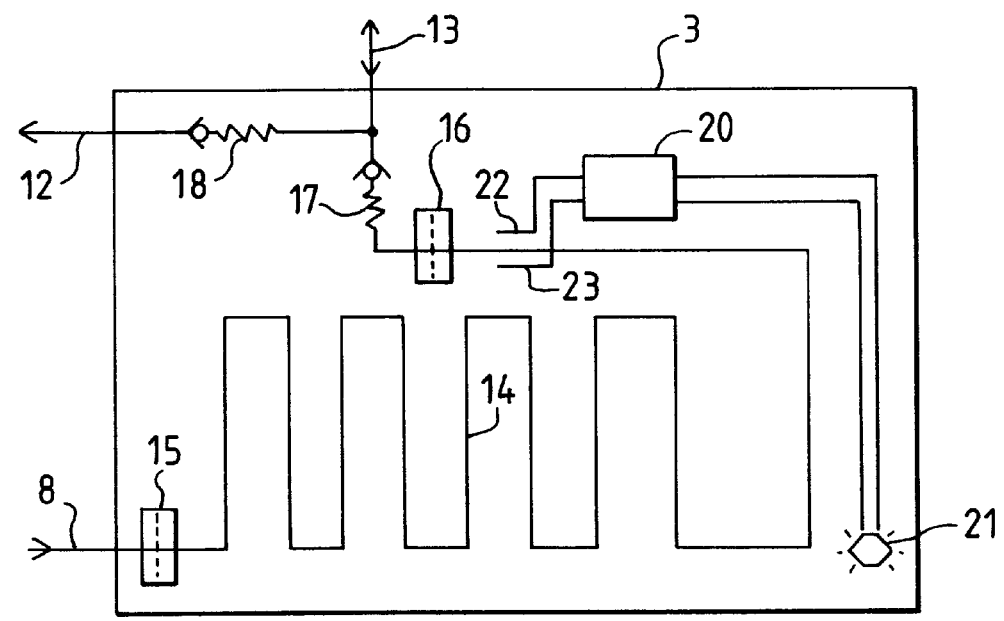

FIGS. 3 and 4 provide a diagrammatic illustration of different possible structures for the antechamber 3 containing the desiccant granulates 4.

In FIG. 3, the antechamber 3 containing the desiccant granulates comprises two apertures 8 and 12 on the outside environment and one aperture 13 providing access to the orifice 2 of the clean chamber 1. The first aperture 8 on the outside environment is an air intake orifice. It leads, by means of a baffle 14 filled with desiccant granulates and closed at its end by filters 15, 16 and by means of a single-action intake valve 17, to the aperture 13 providing access to the orifice 2 of the clean chamber 1. The second aperture 12 on the outside environment is an air delivery vent that bypasses the baffle 14 and is connected by a single-effect back-flow valve 18 to the orifice 2 of the clean chamber 1. In addition to these elements, the antechamber 3 is provided with a porthole 19 enabling a view of the desiccant granulates located at the outlet of the baffle 14, on the same side as the aperture 13 providing access to the orifice 2 of the clean chamber 1. This porthole 19 enables the monitoring, through their change in color, of the state of moisture saturation of the desiccant granulates which are the last to get saturated with moisture since they are located at the end of the baffle.

FIG. 4 can be distinguished from FIG. 3 by the fact that the porthole for the visual monitoring of the state of moisture saturation of the desiccant granulates has been replaced by an electronic moisture meter 20 with a LED indicator 21 and two measurement electrodes 22, 23 positioned in the vicinity of the desiccant granulates located at the outlet of the baffle 14, on the same side as the aperture 13 providing access to the orifice 2 of the clean chamber 1. This electronic moisture meter makes it possible to monitor the moisture saturation rate with far greater precision than with a visual check for it is fairly difficult to assess the change in color of the desiccant granulates, namely the passage from light blue to pale pink.

The use of a vent to bypass the baffle in combination with a single-action back-flow valve is not imperative but is highly recommended in order to prevent a deterioration in the decompression speed of the clean chamber 1 through load losses of the baffle in the event of a sudden drop in the pressure of the outside environment. When a use of this kind is planned, the value of the calibration of the back-flow valve is chosen as a function of the loss of load desired for the back-flow circuit.

In the same way, the use of a single-effect intake valve series-connected with the baffle is not indispensable. Indeed, the calibration of an intake valve gives a simple means to adjust the load loss of the intake circuit. However there are other means to adjust the load loss of the intake circuit, for example the sizing of the baffle especially when it is convergent for it then has a loss of load greater than that of a baffle with a constant section. The elimination of the intake valve tends to simplify the drier and leads to a gain in cost, in terms of both cost price and maintenance. In particular, it increases its reliability.

What is claimed is:

1. A chamber with drier comprising a clean chamber communicating with the outside environment through an orifice equipped with a detachable antechamber filled with desiccant granulates, wherein the chamber comprises, between the orifice of the clean chamber and the detachable antechamber filled with desiccant granulates, a valve that is closed at rest and opened by the positioning, on the orifice of the clean chamber, of the antechamber filled with desiccant granulates and wherein the antechamber filled with desiccant granulates contains a baffle that prevents the air from following a direct route and forces it to encounter the majority of the desiccant granulates.

2. A chamber according to claim 1, wherein the antechamber filled with desiccant granulates comprises filters at both ends of its baffle, these filters holding the desiccant granulates in the baffle and preventing the spread of dust coming from the erosion of the granulates.

3. A chamber according to claim 1 wherein, at the end of its baffle pointed towards the orifice that makes it communicate with the clean chamber, the antechamber filled with desiccant granulates comprises a single-action valve with intake into the clean chamber opening in the compression phase of the internal volume of the clean chamber.

4. A chamber according to claim 1 wherein, at the end of its baffle pointed towards the orifice that makes it communicate with the clean chamber, the antechamber filled with desiccant granulates comprises a single-action valve with intake into the chamber opening in the compression phase of the internal volume of the clean chamber and a single-action valve with back-flow out of the chamber opening in the decompression phase of the internal volume of the clean chamber and placing the chamber directly in communication with the outside environment by means of a vent positioned in parallel on the baffle.

5. A chamber according to claim 1, wherein the baffle of the antechamber filled with desiccant granulates is convergent with a cross-section that narrows down towards the orifice of the chamber.

6. A chamber according to claim 1, wherein the antechamber filled with desiccant granulates contains a convergent baffle and a single-action valve with back flow out of the chamber opening in the decompression phase of the internal volume of the clean chamber and placing the chamber directly in communication with the outside environment by means of a vent positioned in parallel on the baffle.

7. A chamber according to claim 1, wherein the antechamber filled with desiccant granulates is provided with means to monitor the moisture saturation of the desiccant granulates.

8. A chamber according to claim 7, wherein said means to monitor the moisture saturation of the desiccant granulates are visual monitoring means consisting of a window allowing a view of the desiccant granulates placed at the end of the baffle turned towards the orifice of the clean chamber.

9. A chamber according to claim 7, wherein said means to monitor the moisture saturation of the desiccant granulates are electronic monitoring means with two measurement electrodes coming into contact with the desiccant granulates placed at the end of the baffle pointed towards the orifice of the chamber.

* * * * *

UNITED STATES PATENT AND TRADEMARK OFFICE
CERTIFICATE OF CORRECTION

PATENT NO. : 6,110,261

DATED : August 29, 2000

INVENTOR(S): Nicolas Guiragossian

It is certified that an error appears in the above-identified patent and that said Letters Patent is hereby corrected as shown below:

On the title page, Item [30], the Foreign Application Priority Data is listed incorrectly. It should read as follows:

[30] Foreign Application Priority Data

--- May 15, 1998  [FR]  France ........................................ 98 06178 ---

Signed and Sealed this

Fifteenth Day of May, 2001

Attest:

NICHOLAS P. GODICI

Attesting Officer

Acting Director of the United States Patent and Trademark Office